March 16, 1948. C. B. FERREL 2,437,732
APPARATUS FOR PROPELLING AND INCREASING THE LIFT OF AIRPLANES
Filed Jan. 12, 1943 2 Sheets-Sheet 2
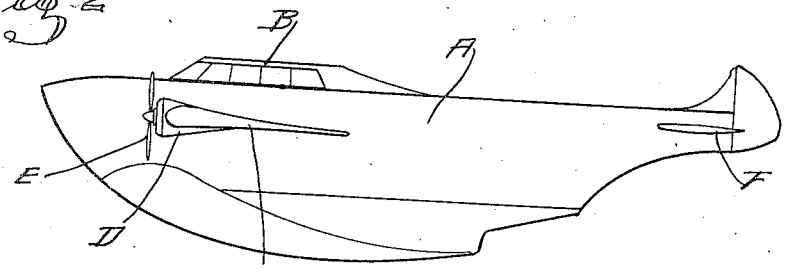
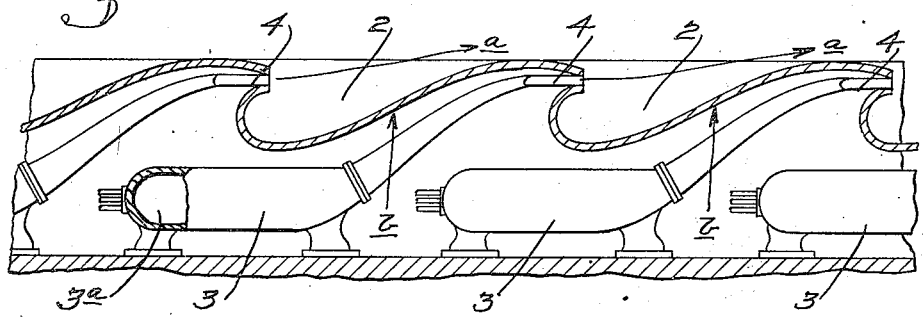
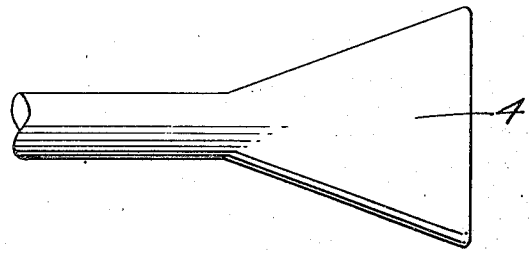
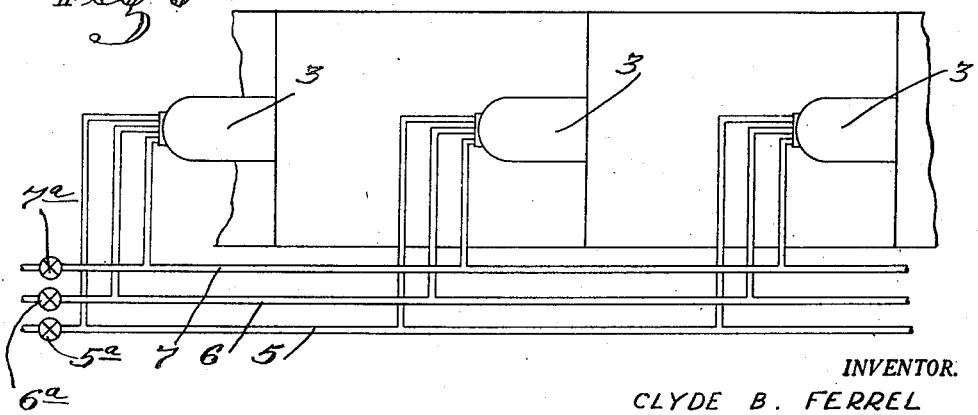
INVENTOR.
CLYDE B. FERREL
BY
Castberg & Roemer,
ATTORNEYS.

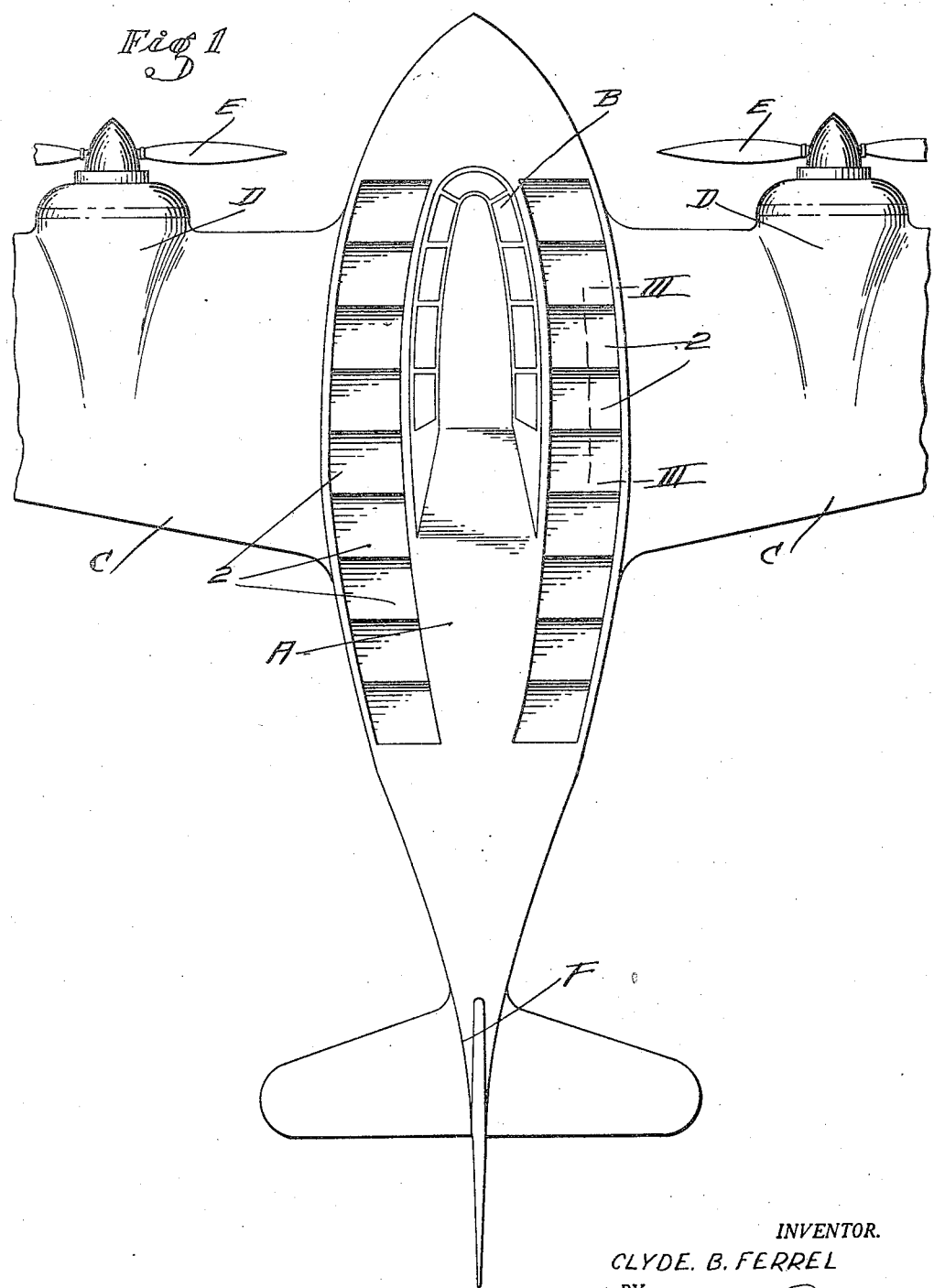

Patented Mar. 16, 1948

2,437,732

UNITED STATES PATENT OFFICE 2,437,732

APPARATUS FOR PROPELLING AND INCREASING THE LIFT OF AIRPLANES

Clyde B. Ferrel, San Francisco, Calif., assignor to Ferrel Industries, Inc., Reno, Nev., a corporation of Nevada Application January 12, 1943, Serial No. 472,138

4 Claims. (Cl. 244—12)

This invention relates to a method for propelling and increasing the lift of airplanes, particularly during the take-off period.

It is well known that the lifting factor or load-carrying ability of a plane is limited by the speed of the plane during the taking off period and that this load can be materially increased either by increasing the taking off speed or by increasing the lifting factor. The object of the present invention is to provide auxiliary propelling means whereby both the speed of a plane and its lifting factor may be materially increased during the taking off period, this being accomplished first by providing a series of rocket motors which by reaction and thrust produced by the discharging products of combustion in the form of jets increases the speed of the plane, and, secondly, by utilizing the jet action to partially evacuate a series of recesses or pockets formed in the upper surface of the plane whereby atmospheric pressure from below said pockets will produce an upward thrust resulting in increased lift.

The invention is shown by way of illustration in the accompanying drawings, in which:

Fig. 1 is a plan view of an airplane equipped with a propelling and lift-increasing mechanism;

Fig. 2 is a side elevation of Fig. 1;

Fig. 3 is an enlarged vertical section taken on the line III—III of Fig. 1;

Fig. 4 is a plan view of one of the propelling nozzles, and

Fig. 5 is a diagrammatic view showing the arrangement of the fuel delivering pipes which are connected with the respective rocket motors.

Referring to the drawings in detail, and particularly Figs. 1 and 2, A indicates the fuselage or hull of an airplane, B the cabin or superstructure, C the wing, D the engine nacelles built into the wing, E the engine driven propellers, and F the tail structure including the rudder and ailerons whereby the plane is controlled.

By referring to Fig. 1, it will be noted that the upper surface of the fuselage is extended laterally from each side of the cabin structure and that a series of pockets generally indicated at 2 are formed in said surface on opposite sides of the cabin and extend rearwardly thereof. An enlarged vertical longitudinal section taken on line III—III of Fig. 1 is shown in Fig. 3 of the drawings. This drawing shows that each pocket has a rocket motor 3 placed below it which terminates in a nozzle 4 (see Fig. 4) which directs a flattened stream or jet of products of combustion over the surface of the pocket rearwardly thereof in the direction of arrows $a$. Each rocket motor is fed with fuel such as alcohol, oxygen and hydrogen through pipes 5, 6 and 7 which are controlled by valves $5a$, $6a$, and $7a$. In actual operation when a plane is ready to take off, the main motive power, as in any ordinary plane, will be supplied by the motors which drive the propellers E—E. These are accordingly started and as the plane begins to reach the maximum speed attainable, the valves $5a$, $6a$, and $7a$ will be opened. The several fuels mix in the rear chamber $3a$ of each rocket motor and ignite due to the presence of the oxygen and hydrogen. Jets of combustion gases will thus almost immediately discharge from each nozzle rearwardly and over the pockets and the reaction produced in the rocket motors themselves and by the jets discharging into the air will provide an added boost or driving force sufficient to increase the forward speed of the plane to a point where it will take off. At the same time the jet action across the pockets is such as to tend to form a partial vacuum therein, with the result that the atmospheric pressure produces an upward thrust on the lower side of each pocket in the direction of arrow $b$. Thus, the jet action does not only increase the speed of the plane and thereby lift, but it further increases the lift by partially evacuating the pockets.

In view of the foregoing, it should be apparent that a plane provided with pockets of the character here disclosed and cooperating rocket motors will be able to carry greater loads as the ground or taking-off speed is materially increased and so is the lifting factor.

It should be understood that the rocket motors are not started when the plane is taking off until the main motors or the propellers driven thereby have brought the general speed of the plane up to about the maximum obtainable. Then by turning on the fuel valves to the rocket motors, an added boost is obtained which is sufficient to increase the speed to the point where the plane takes off. The actual time the rocket motors are employed may only be a minute or two as once the plane is actually off the ground, the speed almost instantly increases to a point where the rocket motors are not needed. Hence, fire danger or overheating of the rocket motors is reduced to a minimum. While Fig. 5 shows the fuel connections to the rocket motors on one side only, it is obvious that the fuel connection for the rocket motors on the opposite side will be the same.

While this and other features of my invention have been more or less specifically described and illustrated, I nevertheless wish it understood that changes may be resorted to within the scope of the appended claims, and that the materials and finish of the various parts employed may be varied according to what the experience of the manufacturer and varying conditions of use may demand.

Having thus described my invention, what I claim and desire to secure by Letters Patent is:

1. In an airplane having a motor-driven propeller for propulsion of the plane, an auxiliary motor for increasing lift and boosting the speed of the plane during the taking off period comprising, a rocket motor having a nozzle discharging a rearwardly directed propelling jet of gases to boost the speed, and a series of pockets formed in the upper surface of the fuselage of the plane and located beyond the inner ends of the wings at said nozzle and beneath and adjacent the rearwardly directed jet of gases so that the pockets will be partially evacuated by the jet action of the gas whereby atmospheric pressure on the plane below the pockets will produce an upward thrust and increase the lift of the plane.

2. In an airplane having a body and propelling means, means for increasing the lift and speed of the plane consisting of an ignition rocket motor adapted to discharge a substantial jet of motive fluid, the plane having a pocket formed in the upper surface of the fuselage beyond the inner ends of the wings, the rocket motor being positioned adjacent the pocket so that the discharged jet therefrom sweeps over the pocket thus producing a partial vacuum within the pocket thereby increasing the lift and speed of the plane.

3. In an airplane having a body and propelling means, means for increasing the lift and speed of the plane consisting of a plurality of ignition rocket motors, each adapted to discharge a separate jet of motive fluid, the plane having a plurality of pockets formed in the upper surface of the fuselage at opposite sides thereof in substantially parallel relationship and beyond the inner ends of the wings, the rocket motors being positioned so that one motor is adjacent each pocket and the motive jet discharged therefrom sweeps over each of the pockets thus producing a partial vacuum within each pocket at opposite sides of the plane thereby increasing the lift and speed of the plane.

4. An airplane as described in and by claim 3 wherein each rocket motor is provided with a discharge nozzle, and the width of the discharge nozzle at its extreme end being substantially of the same width as the pockets.

CLYDE B. FERREL.

REFERENCES CITED

The following references are of record in the file of this patent:

UNITED STATES PATENTS

| Number | Name | Date |
|---|---|---|
| 1,611,353 | Lepinte | Dec. 21, 1926 |
| 1,918,897 | Colburn | July 18, 1933 |
| 1,854,043 | Korner | Apr. 12, 1932 |
| 1,879,717 | Sikorsky | Sept. 27, 1932 |
| 1,973,835 | Wood | Sept. 18, 1934 |
| 2,041,790 | Stalker | May 26, 1936 |
| 2,176,904 | Jackson | Oct. 24, 1939 |

FOREIGN PATENTS

| Number | Country | Date |
|---|---|---|
| 29,364 | Great Britain | 1911 |
| 348,293 | Great Britain | May 14, 1931 |